(No Model.)
R. N. NOYES.
AUTOMATIC DISCONNECTOR FOR TROLLEY WIRES.
No. 500,417. Patented June 27, 1893.
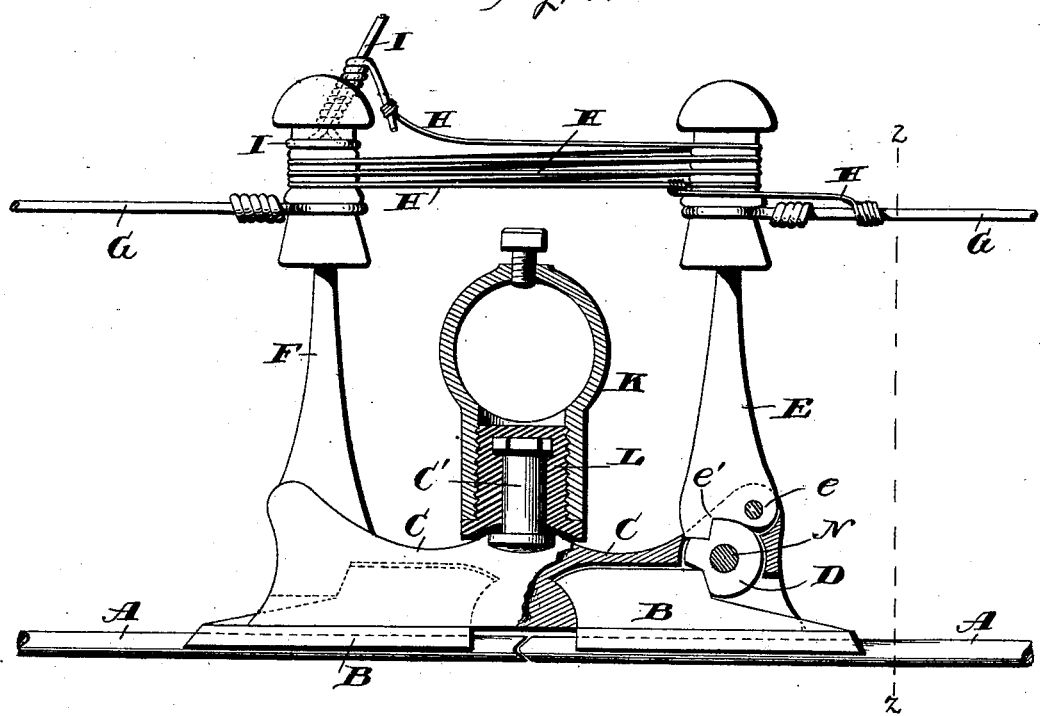
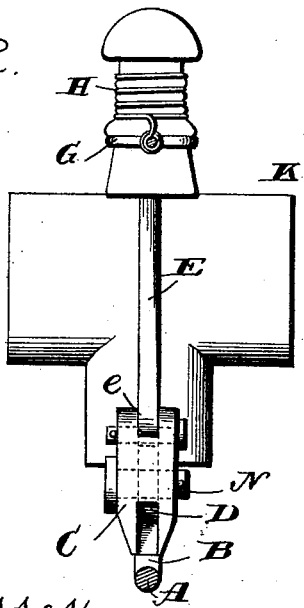
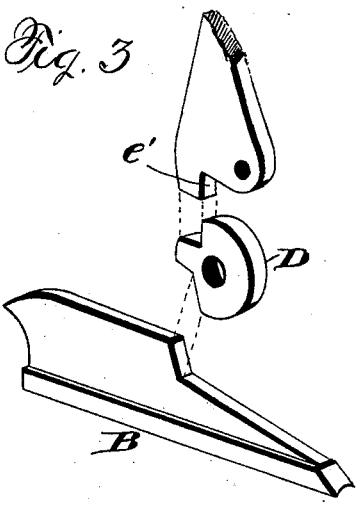
Witnesses
C. J. Williamson
A. L. Hough
Inventor
Ray N. Noyes,
by Franklin H. Hough
Atty

UNITED STATES PATENT OFFICE.

RAY NORTON NOYES, OF HAVERHILL, MASSACHUSETTS.

AUTOMATIC DISCONNECTOR FOR TROLLEY-WIRES.

SPECIFICATION forming part of Letters Patent No. 500,417, dated June 27, 1893.

Application filed January 23, 1893. Serial No. 459,371. (No model.)

*To all whom it may concern:*

Be it known that I, RAY NORTON NOYES, a citizen of the United States, residing at Haverhill, in the county of Essex and State of Massachusetts, have invented certain new and useful Improvements in Methods of Disconnecting the Broken Sections of Trolley-Wires; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in trolley systems, whereby a section of a trolley wire may be readily disconnected from the circuit in case of any breakage of the wire. I also provide means whereby the trolley wire may be disconnected in case an overhead live wire of any kind, commonly crossing above trolley systems, should break and fall so as to come in contact with the trolley wires, thus causing much damage to instruments and property.

My invention will prevent the burning out of telephones, and quickly free the trolley wire from telephone, telegraph or other wires likely to break and fall on the same.

My invention consists further in the novel combination and arrangement of the parts as will be hereinafter more fully described, and then specifically defined in the appended claims.

The invention is clearly illustrated in the accompanying drawings, which with the letters of reference marked thereon, form a part of this specification, like letters of reference indicating like parts throughout the several views in which—

Figure 1, is a longitudinal sectional view through a trolley wire hanger, block and trolley wire. Fig. 2, is a sectional view of a hanger showing trolley wire, block, hanger and hanger casting and wire in cross section. Fig. 3, is a lever for releasing the trolley block.

Reference now being had to the drawings by letter, A, designates a trolley wire, which is suitably fastened as by brazing or soldering to the trolley wire blocks B, which are two in number to each hanger, and are of such shape as to be securely held within the hanger C by the tension of the trolley wire attached to them, when the washer D is in its locking position. E is a lever which is surmounted by an insulator, and is pivoted at *e* to the frame work or hanger C, and the lower end of said lever is notched as shown at *e'* to engage and hold the washer D from turning against the trolley wire block B, thus securing in place the trolley wire.

G is a guard wire which is attached in lengths between the standard F and the lever E on adjacent hangers.

H is a fuse wire smaller in size than the guard wire, and holds the lever in an upright position. One end of this fuse wire is tapped into the guard wire, and the other end is attached to the ground wire secured to the standard, and represented by letter I. Integral with the hanger C is a projection C' over which a rubber screw L fits which serves as an insulator between the hanger C and the pole bracket casting K.

The trolley wire is first strung to the hangers, being secured in the grooved blocks B, and then is divided between the blocks at each hanger and in such a way as to leave a vertical bevel at the ends thus causing portions of one end to overlap portions of another, and allowing the trolley to fall in sections in case of an accident, and with this bevel the trolley will pass over the connections smoothly and without sparking. A continuous current is had through the hanger and the trolley wire blocks.

The operation of my device will be readily understood, and is as follows:—If an overhead wire should fall, the guard wire would probably prevent its touching the trolley wire. If it should touch the trolley wire and guard wire also, a connection would be formed to and through the fuse wire to the ground wire, thus causing the fuse wire to burn off, releasing the lever E from the standard, and the lever would then turn or fall by gravity, the washer D would turn on its pivot N and the section of the trolley wire between the hangers, thus released, would fall to the ground. When the trolley wire is to be replaced in its proper position, the wire, attached to the trolley block is placed in the hanger, the lever drawn back to engage with the washer and is held with a new fuse wire ready for further use.

In cities where the apparatus is used, firemen provided with a pole having a copper rod attached at the end, could, by bringing this rod in contact with the guard and trolley wires, burn the fuse wire and disconnect the section of trolley wire desired, thus preventing any possible injury to the firemen in operating the hose and stream of water.

A main feed wire should be carried along the poles and tapped onto the hangers at intervals. This main feed wire carries a large portion of the current, so that the resistance of the hangers would be of very little account.

I do not desire to limit myself to the precise construction and arrangement of plates shown, as it is at once evident that the same may be varied within certain limits without departing from the spirit of my invention.

Having thus described my invention, what I claim to be new, and desire to secure by Letters Patent, is—

1. The combination with a trolley-wire, of a block thereon, a fusible support and intermediate devices normally restrained by said support for holding the block which is on the wire, substantially as described.

2. The combination with a trolley-wire and a block attached thereto of a pivoted part, fusible means for holding it in its vertical position, and a rotatable part interposed between the vertical part and the block, substantially as and for the purpose described.

3. In combination with the wire-support, the trolley-wire, the block B secured thereto and detachably connected with the wire support, the fixed and pivoted standards, the fusible wires connecting the same, the guard wires attached to the standards, the locking part D interposed between the pivoted standard and the block B and serving to normally hold the block in position and to release the same upon the falling of the pivoted standard upon occasion of the fusing of the wire connecting the standards, substantially as described.

4. In combination a trolley wire, trolley wire block, notched washer, and a notched lever locking device for holding the trolley wire block in place, substantially as shown and described.

In testimony whereof I affix my signature in presence of two witnesses.

RAY NORTON NOYES.

Witnesses:
STEPHEN NOYES,
LIZZIE B. CHADWICK.